United States Patent [19]

Escaravage

[11] Patent Number: 4,867,477.

[45] Date of Patent: Sep. 19, 1989

[54] DEVICE FOR MAINTAINING A STRAP OF A SAFETY BELT IN AN ADJUSTABLE POSITION

[75] Inventor: Gérard Escaravage, Valentigney, France

[73] Assignee: ECIA - Equipements Et Composants Pour L'Industrie Automobile, Audincourt, France

[21] Appl. No.: 198,348

[22] Filed: May 25, 1988

[30] Foreign Application Priority Data

May 27, 1987 [FR] France .................................. 87 07510

[51] Int. Cl.⁴ .......................................... B60R 22/20
[52] U.S. Cl. ................................... 280/808; 248/297.3
[58] Field of Search .............................. 280/801, 808; 248/297.3, 499; 297/468, 483; 292/152, 150; 403/329, 325

[56] References Cited

U.S. PATENT DOCUMENTS

| | | | |
|---|---|---|---|
| 4,508,363 | 4/1985 | Temple | 280/808 |
| 4,522,426 | 6/1985 | Weman | 280/801 |
| 4,640,550 | 2/1987 | Håkansson | 297/483 |

FOREIGN PATENT DOCUMENTS

| | | | |
|---|---|---|---|
| 2460092 | 6/1976 | Fed. Rep. of Germany . | |
| 2813533 | 10/1979 | Fed. Rep. of Germany | 280/801 |
| 3116909 | 11/1982 | Fed. Rep. of Germany . | |
| 3319071 | 11/1984 | Fed. Rep. of Germany . | |
| 3400214 | 6/1986 | Fed. Rep. of Germany | 280/808 |
| 2590215 | 5/1987 | France | 280/808 |
| 1497397 | 1/1978 | United Kingdom | 280/808 |

*Primary Examiner*—Charles A. Marmor
*Assistant Examiner*—Karin Tyson
*Attorney, Agent, or Firm*—Sughrue, Mion, Zinn, Macpeak & Seas

[57] ABSTRACT

The device comprises a body (10), a lock (20) and a strap holder (30) and is adapted to be fixed to a structure (50). The body comprising a support (11) and a base (12) which is provided with a slot (13) receiving the keeper (21) of the lock. This keeper, which is normally biased by a spring (23) into the engaging position in which it traps the catch 22 of the lock, is movable to a disengaging position in which the catch, which is connected to the strap holder, can be shifted between various positions. Application in the chest part of a safety belt strap for an automobile.

12 Claims, 1 Drawing Sheet

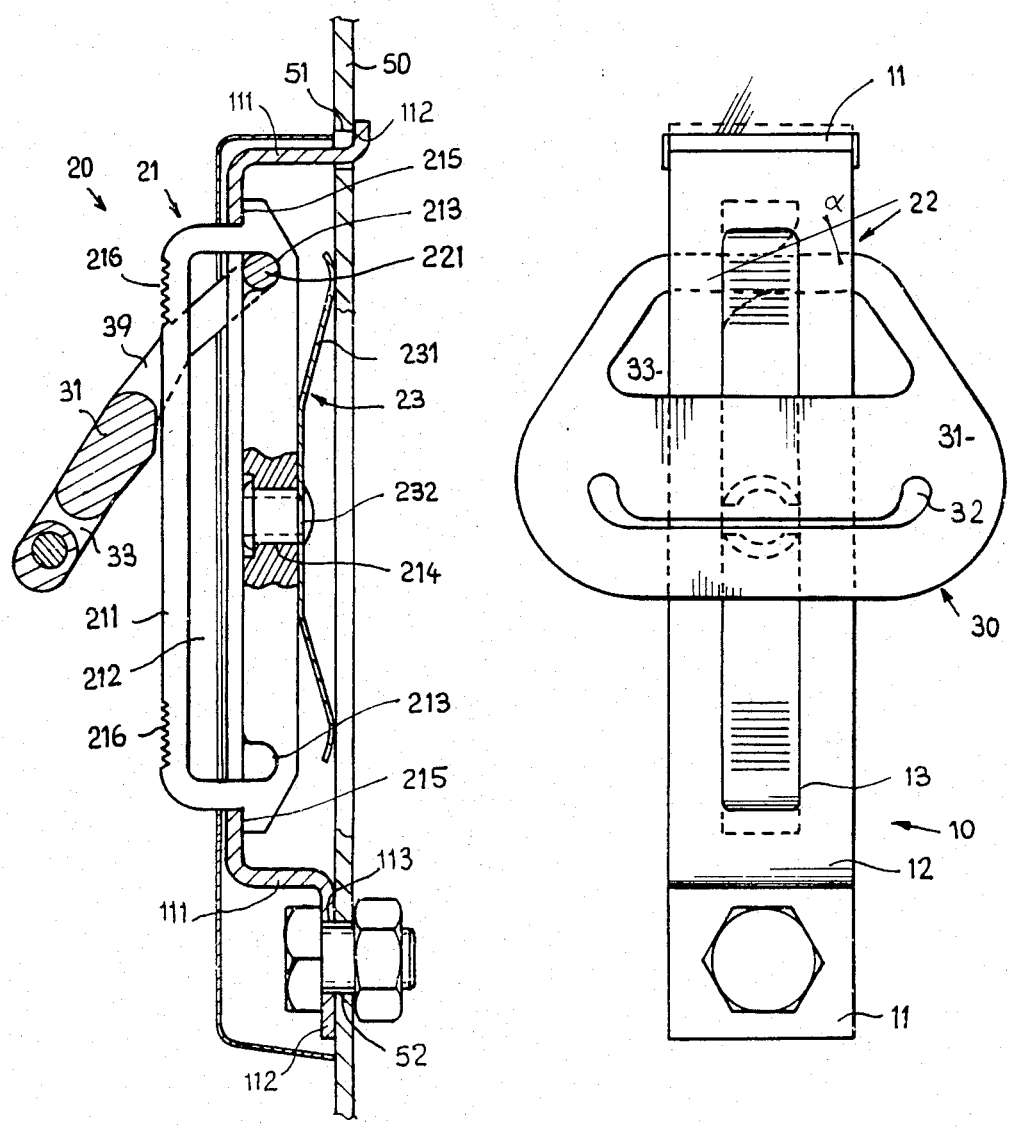

DEVICE FOR MAINTAINING A STRAP OF A SAFETY BELT IN AN ADJUSTABLE POSITION

The present invention relates to safety belts for vehicles transporting passengers, in particular over ground, and has for object more particularly to provide a device for maintaining a strap of a safety belt in an adjustable position and adapted to be fixed to a structure of the vehicle.

As is known, for reasons of safety, passenger-transporting vehicles are usually provided with seats equipped with safety belts. This is for example the case of aircraft and automobile vehicles.

As concerns automobile vehicles, safety belts are usually employed which have two or three anchoring points. When a safety belt ha ving three anchoring points is used, the strap includes a waist part and a chest part which crosses the chest of the wearer in the manner of a shoulder belt.

When a safety belt of the last-mentioned type is used, the chest part occupies a position relative to the wearer which is a function of the morphology of the latter, of the geometry of the vehicle and seat and also of the state of fatigue of the wearer. Under these conditions, the chest part may be located in some cases in the region of the neck of the wearer. Thus, it will be understood that, in the case of a violent collision, as the safety belt is immobilized under the control of an inertia detector, the body of the passenger is violently projected forwardly and his neck encounters the strap which may then behave, not as a safety means, but as a particularly dangerous object. Indeed, it has been found that in certain kinds of collision, serious injury to the neck is caused by the safety belt and more particularly its chest part.

This is the reason why it has already been proposed to arrange that the upper anchoring point of the chest part be in an adjustable position in order to take into account the morphology of the wearer relative to the configuration of the vehicle.

Various devices have already been proposed.

Very often, they have such configuration that the upper anchoring point of the chest part may occupy multiple positions within a range whose amplitude takes into account extreme morphologies of a population as compared to the mean morphology.

These devices, which are sometimes motorized, are very complicated. They very often employ screw-and-nut mechanisms which enable the position of the upper anchoring point of the chest part to be progressively varied.

Other embodiments employ catches and apertures with respect to which mechanisms including a moving carriage are shifted.

Consequently, it will be understood that all these devices are complicated and therefore not very reliable and relatively expensive.

An object of the invention is to provide a device for maintaining a strap of a safety belt in an adjustable position which avoids all these drawbacks and is relatively cheap to manufacture and place in position.

The invention provides a device for maintaining a strap of a safety belt in an adjustable position, adapted to be fixed to a structure and comprising, among other elements, a body, a lock and a strap holder. The feature of this device is that its body comprises an anchoring support and a base provided with a slot, its lock comprises a keeper engaged in said slot and movable between a disengaging position and an engaging position, a catch associated with the strap holder and movable relative to said body and said keeper in such manner as to be movable to either one of at least two distinct positions when the keeper is in its disengaging position so as to be immobilized in one of said positions when the keeper is in its engaging position, and a spring for normally biasing the keeper into its engaging position.

Other features of the invention will be apparent from the following description and claims with reference to the accompanying drawing which is given solely by way of example and in which:

FIG. 1 is a diagrammatic front elevational view of an embodiment of a device according to the invention, and FIG. 2 is a longitudinal sectional view of FIG. 1.

As safety belts and arrangements for mounting them, in particular safety belts for automobile vehicles, are well known in the art, the following description will be limited to that which directly or indirectly concerns the invention. For the rest of the structure, one skilled in the considered art will be able to refer to conventional solutions for solving particular problems which may be encountered.

As can be seen in the Figures, the invention concerns a device for maintaining a strap of a safety belt in an adjustable position and adapted to be fixed to a structure or body 50 of a vehicle. More particularly, the part of the considered structure is the central post or middle foot located between the front and rear side doors of a vehicle having four doors.

The device according to the invention comprises, among other elements, a body 10, a lock 20 and a strap holder 30. For convenience of illustration, the strap proper is not shown.

As can be seen, the body 10 comprises an anchoring support 11 and a base 12 provided with a slot 13. In the illustrated embodiment, this body is arranged as a stirrup whose parallel branches 111 each terminate in a flange 112 and are interconnected by a transverse bar 12 which constitutes the base proper. As can be seen, one of the flanges 112 is engaged in an opening 51 of the structure and the other of the flanges 112 is provided with an aperture 113 adapted to cooperate with a corresponding aperture 52 of the structure for receiving a fixing means such as for example a screw and a nut, as illustrated but carrying no reference numerals.

The lock 20 comprises a keeper 21, a catch 22 and a spring 23.

The keeper 21 is in the form of a bar 211 in which is formed a cavity 212 in which are provided at least two notches 213 and an orifice 214, for example located between these notches. This bar is also provided with bearing surfaces 215 and ribs 216 on the outer side.

As can be seen, the catch 22 essentially comprises a cross-bar 221 of the strap holder 30. The spring 23 is in the form of a spring strip 231 in which is provided, approximately in the middle thereof, an opening 232 adapted to cooperate with the orifice 213 for receiving retaining means 233 such as for example a rivet as illustrated.

The strap holder 30 is formed by a frame 31, for example a moulded plastics material, in which a strap passage 32 and a slot or opening 33 are provided. The cross-bar 221 of the catch 22 is for example a metal rod shaped as a ring which is approximately trapezoidal and embedded in the plastics material of the body as is shown in the Figures.

The dimensions of the orifice 214 provided in the keeper 21 are such that they permit passing therethrough the catch of the strap holder in such manner as to place it inside the cavity 212. Consequently, retaining means 233, for example the rivet, may be engaged in this orifice and the spring strip 231 may be adapted on the rivet by inserting the rivet in the orifice 232.

It is then possible to place, if this has not already been done, this sub-assembly which constitutes the lock proper, in the body 10 as illustrated. As the body 10 and the lock 20 are in this way interconnected, it is then sufficient to engage one of the flanges 112 in the opening 51 of the structure and then fix the other flange to the structure by suitable fixing means such as for example a screw-and-nut means extending through the apertures 52 and 113, as illustrated.

Thus, it can be seen that the catch 22, namely its crossbar 221, can be placed in one of the notches 213 formed in the cavity 212. It is then sufficient to depress the bar 211 of the keeper 21, for example in the region of the ribs 216, to shift the keeper 21 back into the body 10 in opposition to the force exerted by the spring 23. The catch 22 is then disengaged from the notch 213 of the keeper 21 and can be placed as desired in either one of the two notches. When this has been done, it is sufficient to release the bar 221 of the keeper to enable the latter, which is biased by the spring, to return toward the body where its bearing surfaces 215 are applied, in the vicinity of the ends of the slot 13, against the base 12. When this has been done, it can be seen that the strap holder 30 is immobilized between one of the notches 213 and the rear side of the base 12 of the body 10 next to where the slot 13 is provided.

The keeper 21 of the lock 20 merely serves to immobilize the catch 20 of the strap holder 30 in height. In the case of the transmission of forces, it is the body 10 of the device according to the invention, which is fixed to the body or structure 50, which is subjected to and transmits all the stresses due to a sudden deceleration.

Thus, it can be seen that the device according to the invention permits a convenient and effective adjustment, with a minimum of component parts, of the upper anchoring point of the chest part of the safety belt strap. In the illustrated embodiment, merely two notches are provided which determine the positions, which are adjustable as desired, of the strap holder. But it will be clear that other notches may be provided which determine, for example, intermediate positions between the two illustrated positions. As can be seen, the keeper 21 is movable between a disengaging position in which it releases the catch 22 which can then be shifted as desired, and an engaging position, in which the catch is trapped in the position in which it was placed, and toward which enaging position it is normally elastically yieldably biased by a spring having one side bearing against the bar of the keeper and the other side bearing against the structure.

For the passenger's comfort, it is important to arrange that the catch 22 does not remain with an orientation substantially orthogonal to the direction of the slot 13. For this purpose, the edges of the notches are profiled as shown in FIG. 1 so that the catch is capable, under the effect of the strap holder, of being inclined at an angle of as illustrated. This inclination may be produced in only one direction or in two opposite directions.

I claim:

1. A device for maintaining a strap of a safety belt in an adjustable position, for fixing to a structure and comprising a body, a lock and a strap holder, the body including an anchoring support and a base provided with a slot, the lock comprising a keeper retained in said slot and movable between a disengaging position and an engaging position, a catch on the strap holder and movable relative to the body and said keeper in a direction parallel to said slot in such manner as to be capable of being placed in either one of at least two distinct positions along said slot when the keeper is in said disengaging position so that it is immobilized in one of said positions by the keeper when the keeper is in said engaging position, and a spring for normally biasing the keeper toward said engaging position.

2. A device according to claim 1, wherein the body is in the form of a stirrup comprising a bar and substantially parallel branches extending from the bar and each terminating in a flange constituting the anchoring support, said bar constituting said base.

3. A device according to claim 2, wherein one of the flanges is for engagement in a corresponding opening of said structure and the other of the flanges is provided with an aperture for placing in correspondence with a corresponding aperture in said structure for receiving a fixing means.

4. A device according to claim 1, wherein the keeper has the shape of a ring in which is provided a cavity on an inner side of which cavity are provided at least two notches for receiving, as desired, the catch and an orifice between the notches for mounting the spring.

5. A device according to claim 4, wherein the orifice has such dimensions as to permit the passage of the catch upon assembly.

6. A device according to claim 4, wherein the spring is in the form of a strip having in the vicinity of the middle part of the strip an opening which is cooperative with the orifice of the bar for receiving retaining means and so shaped that a side of the strip bears against the bar and an opposite side is for bearing against said structure.

7. A device according to claim 1, wherein the catch is in the form of a cross-bar connected to the strap holder.

8. A device according to claim 1, wherein the strap holder is provided with a strap passage oriented in a direction substantially perpendicular to the slot.

9. A device according to claim 8, wherein the passage acts as a strap return means for a chest part of a safety belt strap.

10. A device according to claim 8, wherein the strap holder is provided with an opening which is substantially perpendicular to the slot, and said opening is located between the catch and the passage of the strap holder.

11. A device according to claim 1, wherein the keeper comprises bearing surfaces which are cooperative with said body for determining the position of the keeper in said engaging position thereof.

12. A device according to claim 4, wherein the notches have edges which are so profiled as to enable the strap holder to be inclined at least in one direction at a given angle $\alpha$.

* * * * *